Dec. 24, 1963   R. W. SMITH   3,115,074
SLED TYPE STABILIZER
Filed Nov. 4, 1960   2 Sheets-Sheet 1
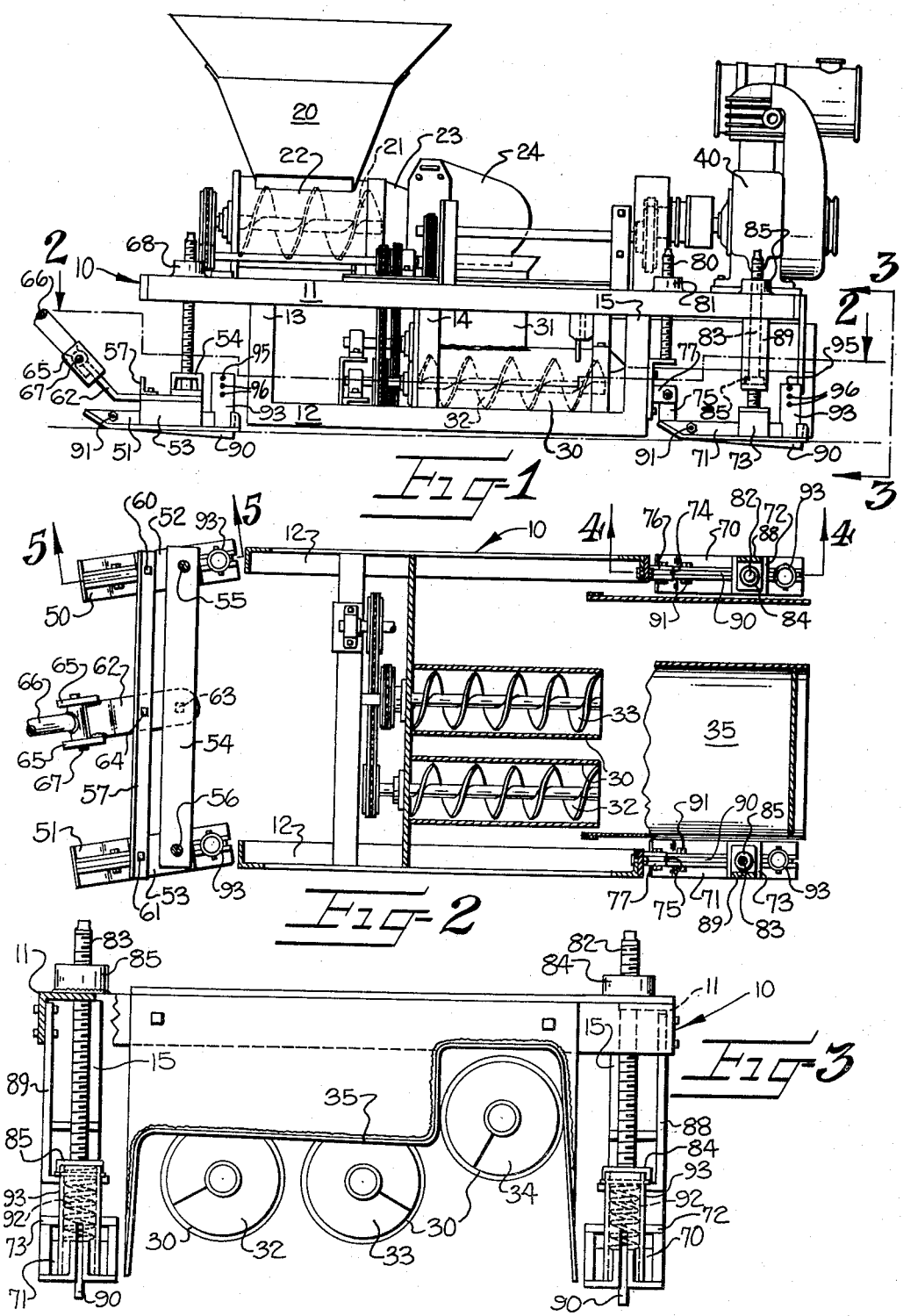

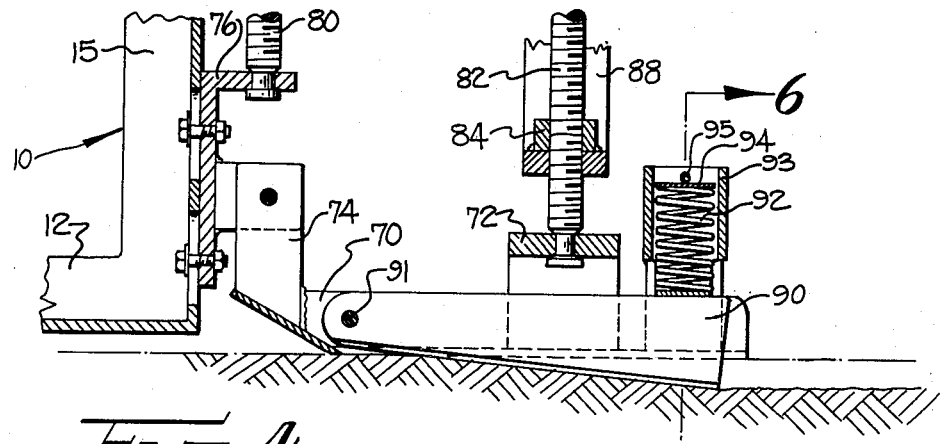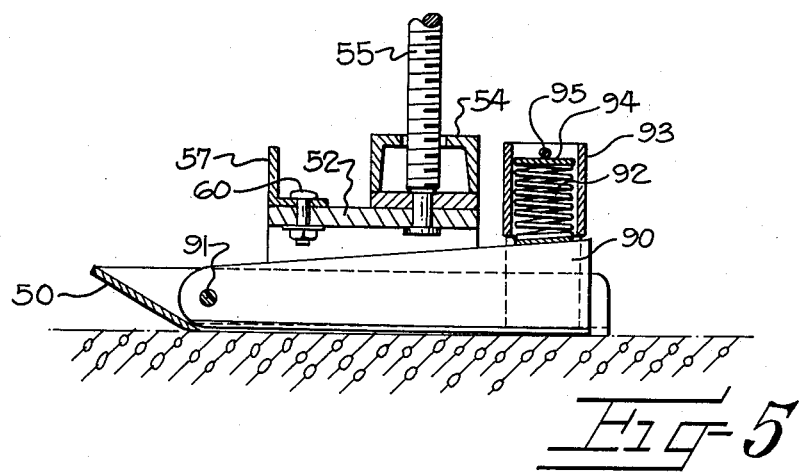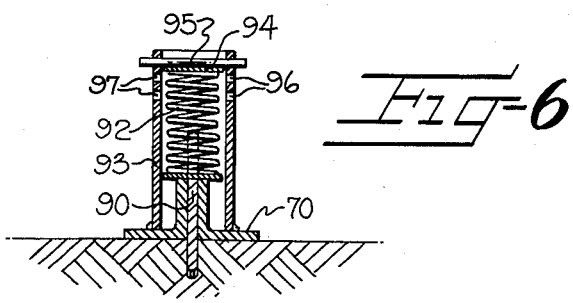

United States Patent Office 3,115,074
Patented Dec. 24, 1963

3,115,074
SLED TYPE STABILIZER
Roy W. Smith, Salisbury, N.C., assignor to Power Curbers, Inc., Salisbury, N.C., a corporation of North Carolina
Filed Nov. 4, 1960, Ser. No. 67,244
2 Claims. (Cl. 94—46)

This invention relates to curb and pavement laying machines and is particularly concerned with improvements in curb laying machines of the character disclosed in a patent to William E. Canfield, Patent No. 2,707,422, issued on May 3, 1955 and a patent to William E. Canfield and Roy W. Smith, Patent No. 2,818,790 issued on January 7, 1958.

The machine disclosed in Patent No. 2,707,422 generally comprises a horizontally disposed tube above one end of which a hopper is disposed and within which a driven screw is disposed for propelling and compressing the paving material, directed into the tube from the hopper, rearwardly through said tube. The rear end of the tube has an elongated mold connected thereto and communicating therewith, the mold having an open bottom and an open rear end whereby the paving material extruded by the screw from the tube is formed according to the shape of the mold and molded upon the surface upon which the machine is positioned so the machine is propelled due to the thrust of the screw in compressing the paving material.

The machine disclosed in the Patent No. 2,818,790 generally comprises a first horizontally disposed tube above one end of which a hopper is disposed and within which a driven screw is disposed for propelling and compressing the material, directed into the tube from the hopper, rearwardly through said tube. A manifold is positioned at the end of said first tube to receive paving material from the first tube and communicates with a second plurality of tubes disposed on a lower level than the first tube. Each of the second plurality of tubes having a driven screw therein for compacting and extruding paving material therefrom and the rear end of these tubes communicate with a common open-bottom mold which is open at its rear end whereby relatively wide or expansive sections of paving may be molded thereby.

Both of the machines disclosed in the patents aforementioned, are provided with wheels which support the machine for movement over the surface upon which the paving strips are to be formed. In the use of these apparatuses, some difficulties have been encountered. When the screws compress the paving material in the mold, the apparatus will normally be moved forwardly in a straight line, but, if the apparatus is laying the paving material around a bend or a curve, the rear portion of the apparatus will have a tendency to be moved sidewise since the force of the material being moved into the mold on the material already in the mold will be at an angle rather than in a straight line. If the wheels were to strike a stone or uneven place in the surface, the wheels may be moved sidewise and therefore depart from the straight line movement. The sidewise movement of the apparatus will cause the rear portion of the mold to bind against the strip of paving being formed giving an uneven appearance thereto. Also, the apparatus will be thrown off line and will not lay the strip in the desired position.

Other difficulties have been encountered in trying to turn the apparatus from a straight line in that when the front wheels are turned from a straight line they have a tendency to slide over the surface upon which the apparatus is moving rather than to cause the apparatus to negotiate the bend or curve since they do not positively grip the surface but have only frictional contact therewith.

It is the primary object of the present invention to provide improved apparatus for laying strips of paving material on a surface having stabilizing means for engaging the surface to minimize sidewise movement of the apparatus and to aid in the laying of the strips of pavement around bends or curves.

A more specific object of this invention is to provide improved apparatus for laying strips of paving material such as concrete, asphalt, or the like having members urged into contact with the surface upon which the strips are to be laid for stabilizing the machine to minimize sidewise movement and to aid in negotiating bends and turns.

Another object of this invention is to provide an improvement apparatus for laying strips of paving material on a surface and having means urged into contact with the surface to stabilize the apparatus for minimizing the sidewise movement thereof and aiding in the negotiation of bends and curves wherein the means urging the stabilizing means into contact with the surface is adjustable.

Some of the objects of the invention having been stated, other objects will appear as the description proceeds when taken in connection with the accompanying drawings, in which—

FIGURE 1 is a side elevation of the improved apparatus;

FIGURE 2 is a longitudinal section taken substantially along line 2—2 in FIGURE 1;

FIGURE 3 is a rear elevation looking in the direction of line 3—3 of FIGURE 1 with portions of the apparatus removed for clarity;

FIGURE 4 is a fragmentary section taken substantially along line 4—4 of FIGURE 2;

FIGURE 5 is a fragmentary section taken substantially along line 5—5 of FIGURE 2; and FIGURE 6 is a section taken substantially along line 6—6 of FIGURE 4.

Referring more specifically to the drawings, and particularly to FIGURE 1, the apparatus comprises a frame 10 having two sets of upper and lower longitudinal side frame members 11, 12 (FIGURES 2 and 3) which are secured in spaced relation to each other by upright frame members 13, 14 and 15. The upper longitudinal frame members 11 are joined together by suitable cross bars or transverse frame members (not shown).

A suitable hopper 20 is provided on the forward portion of frame 10 for receiving the paving material and feeding the same to an upper screw-type conveyor or extruding means 21 mounted for rotary movement in a first tube 22. Hopper 20 has an open bottom which communicates with the first tube 22, to the upper portion of which the hopper 20 is suitably secured. The horizontally disposed first tube 22 is suitably secured to the frame 10 and its open rear end has a substantially rectangular tubular extension or nozzle 23 communicatively connected thereto which is also open at its rear end. The open rear end of the tubular extension or nozzle 23 communicates with a suitable baffle 24 which directs the paving material downwardly.

The paving material is moved from the rear portion of tube 22 by lower tubes 30 which have a hopper portion 31 communicating with the baffle 24 on the nozzle 23 of tube 22. A plurality of screw-type conveyors or extruding means 32, 33 and 34 are provided in tubes 30 for moving the paving material rearwardly therein. A suitable mold 35 is mounted on frame 10 at the open rear ends of tubes 30 and communicates therewith for receipt of the paving material which is moved rearwardly in tubes 30 by the extruding means 32, 33, 34. The screw-type conveyor 21 in the first tube 22 and the screw-type conveyors 32, 33, 34 in tubes 30 are driven by suitable shafts, pulleys, and endless chains from a motor 40, shown in the form of an internal combustion engine supported on the frame 10.

The forward portion of the frame 10 is normally supported by a pair of skid members 50, 51. Skid members 50, 51 have bracket members 52, 53 attached thereto intermediate the ends thereof. Brackets 52, 53 are connected together by a transverse member 54 attached to the brackets 52, 53 by the penetration therethrough of the lower ends of screw members 55, 56 and the bradding or peening of these ends on the underside of brackets 52, 53. Forwardly of the transverse member 54, the brackets 52, 53 are connected together by a second transverse member 57 which is attached to the brackets 52, 53 by bolts 60, 61 with a loose connection to provide limited pivotal movement between the brackets 52, 53 and the second transverse member 57.

A tongue member 62 is pivotally connected to the first transverse member 54 by a bolt 63 and to the second transverse member 57 by a bolt 64 with loose connections at both points of connection to allow limited pivotal movement between the tongue member 62 and the transverse members 54, 57. The tongue member 62 has a bracket 65 attached to the forward end thereof which is secured to a suitable handle 66 by a pin 67 which extends therethrough to allow the tongue member to be moved about its pivot 63.

The front skids 50, 51 are secured to the front portion of the frame 10 by the screw members 55, 56 which are threadably received in nut members 68 attached to the front portion of the frame members 11. The distance at which the forward portion of the frame member 10 is supported above the surface is adjustable in that the screw members 55, 56 may be turned relative to the nuts 68 to vary the distance between the skid members 50, 51 and the front portion of the frame members 11.

The rear portion of the frame 10 is supported by a pair of skids 70, 71 having brackets 72, 73 attached intermediate the ends thereof. The forward portion of skids 70, 71 have brackets 74, 75 fixed thereon which are secured to the frame member 15 by suitable brackets 76, 77. Brackets 76, 77 are slidably mounted on upright frame member 15 with a loose connection by suitable bolts whereby the brackets 76, 77 may be shifted upwardly or downwardly along the upright frame member 15. The brackets 76, 77 are attached to the upper longitudinal frame members 11 by screw members 80 which are threadably received in nuts 81 for adjustment of the brackets 76, 77 relative to the upright frame member 15.

Brackets 72, 73 on skids 70, 71 are connected to the longitudinally frame members 11 by screws 82, 83 which are threadably received in two pairs of nut members 84, 85 secured to the upper longitudinal member 11 and to a pair of brackets 88, 89 depended therefrom. The screw members 82, 83 are adapted to be turned in the nut members 84, 85 for vertical adjustment of the skids 70, 71.

It will be apparent that when the distance at which the frame 10 is supported above the surface is desired to be changed, the screw members 55, 56, 80, 82 and 83 may be rotated in their respective nut members whereby the skids 50, 51, 70 and 71 are raised or lowered relative to the frame members 11 so that the frame 10 is raised or lowered relative to the surface upon which the strips of paving material are to be formed.

Each of the skids 50, 51, 70 and 71 has a stabilizing member 90 pivotally mounted adjacent the forward end by a suitable pivot pin 91. Skids 50, 51, 70 and 71 have suitable slots longitudinally thereof along the center line of the skid members and with upstanding flanges to guide the stabilizing member 90 in its pivotal movement about the pivot pins 91.

The rear end of hte stabilizing member 90 is biased downwardly relative to the skid members by a suitable compression spring 92 which is received within a cylinder 93 mounted on the rear end of the skid members 50, 51, 70 and 71. The force by which the spring member 92 biases the stabilizing member 90 into engagement with the surface is adjustable by means of a plate 94 which is in contact with the top of the spring and a pin 95 which engages the plate and has opposite ends which extend into suitable openings 96, 97 in each side of the cylinder 93. The spring force may be increased or decreased by raising or lowering the plate 94 relative to the stabilizing member 90 by placing the pin 95 in the different openings 96, 97.

In operation, as the apparatus is moved over a surface upon which the strips of paving material are to be formed, the stabilizing members 90 will be pivoted downwardly about their pivots 91 by the compression springs 92 into engagement with the surface. As seen in FIGURES 4 and 6, the stabilizing members 90 will be forced into the surface somewhat by the spring pressure of compression springs 92 and will have a tendency to prevent sidewise movement of the skid members as the apparatus moves over the surface. If the apparatus is being used on a very hard surface, as shown in FIGURE 5, the spring pressure on the stabilizing member 90 will still have a tendency to move the stabilizing member into the surface which will also resist sidewise movement of the skid members. Also, the spring member 92 has a tendency to absorb shocks and vibrations and will reduce the vibration of the apparatus when moved over the surface.

When the front skids 50, 51 are pivoted about their pivots 55, on the lower ends of screw members 55, 56, the stabilizing members 90 will aid the apparatus negotiating the bend or curve inasmuch as they have a tendency to penetrate within the surface which gives a positive grip on the surface which will tend to prevent sidewise movement of the skids.

It is therefore apparent that the control of the apparatus in its movement in a straight line and in negotiating curves and bends is enhanced since sidewise slippage of the skids on the surface is minimized.

In the drawings and specification there has been set forth a preferred embodiment of the invention and, although specific terms are employed, they are used in a generic and descriptive sense only and not for purposes of limitation, the scope of the invention being defined in the claims.

I claim:

1. In an apparatus for forming strips of paving material such as curbs and the like on a surface, said apparatus having an elongate frame, a hopper mounted on said frame and adapted to receive paving material therein, an elongate mold mounted on said frame and having an open bottom and an open rear end, means for moving paving material from the hopper into the mold and for packing the paving material into the mold to form the strips of paving material and to move the apparatus forwardly over the surface due to the pressure of the material being moved into the mold on the material within the mold; in combination therewith, first and second pairs of skid members mounted on said frame for contact with the surface to support said frame above the surface, one of said pairs of said skid members being mounted for pivotal movement about a vertical axis for guiding the apparatus over the surface, an elongate stabilizing member pivotally mounted at one end thereof on each of said skid members for pivotal movement about a horizontal axis transversely of said frame, an adjustable spring mounted on each of said skids and engaging the upper surface of the corresponding stabilizing member for biasing said stabilizing member into contact with the surface, and means operatively associated with said springs for adjusting the downward force exerted thereby on said stabilizing members for moving said stabilizing members into contact with the surface with a variable force to minimize sidewise movement of the skid members on the surface.

2. In an apparatus for forming strips of paving material such as curbs and the like on a surface, said apparatus having an elongate frame, a hopper mounted on said frame and adapted to receive paving material therein, an elongate mold mounted on said frame and having an open bottom and an open rear end, means for moving paving material from the hopper into the mold and for packing the paving material into the mold to form the strips of paving material and to move the apparatus forwardly over the surface due to the pressure of the material being moved into the mold on the material within the mold; in combination therewith, first and second pairs of skid members mounted on said frame for contact with the surface to support said frame above the surface, one of said pairs of said skid members being mounted for pivotal movement about a vertical axis for guiding the apparatus over the surface, each of said skid members having an elongate slot extending vertically therethrough and communicating with the surface, an elongate stabilizing member pivotally mounted at one end on the forward portion of each of said skid members and extending into the slot in said skid member and adapted to contact the surface, compression springs resting on the rear portion of said stabilizing members, a cylinder mounted on each of said skid members and receiving the upper portion of one of said compression springs therein and having a plurality of vertically spaced pairs of diametrically opposed openings therein, a plate slidably mounted within each of said cylinders nad engaging the top of the compression spring therein, and a pin for each cylinder selectively positioned in one of said pairs of diametrically opposed openings above said plate for varying the compressive force exerted by said compression springs on said stabilizing members to move said stabilizing members into contact with the surface with a variable force to minimize sidewise movement of the skid members on the surface.

References Cited in the file of this patent
UNITED STATES PATENTS

| | | |
|---|---|---|
| 1,053,876 | Riley et al. | Feb. 18, 1913 |
| 1,468,682 | Wallace | Sept. 25, 1923 |
| 1,810,505 | Tucker | June 16, 1931 |
| 2,197,878 | Robinson | Apr. 23, 1940 |
| 2,331,561 | Marr | Oct. 12, 1943 |
| 2,707,422 | Canfield | May 3, 1955 |
| 2,741,487 | Carefoot | Apr. 10, 1956 |
| 2,818,790 | Canfield et al. | Jan. 7, 1958 |
| 2,932,875 | Butcher | Apr. 19, 1960 |

FOREIGN PATENTS

| | | |
|---|---|---|
| 173,972 | Austria | Feb. 10, 1953 |